(12) United States Patent
Rottler et al.

(10) Patent No.: US 12,066,043 B2
(45) Date of Patent: Aug. 20, 2024

(54) HOLDING DEVICE AND METHOD FOR ATTACHING SAME

(71) Applicant: SFS Group International AG, St. Gallen (CH)

(72) Inventors: Markus Rottler, Ebhausen (DE); Kai Heineke, Bad Teinach/Zavelstein (DE)

(73) Assignee: SFS Group International AG, St. Gallen (CH)

( * ) Notice: Subject to any disclaimer, the term of this patent is extended or adjusted under 35 U.S.C. 154(b) by 156 days.

(21) Appl. No.: 17/844,135

(22) Filed: Jun. 20, 2022

(65) Prior Publication Data

US 2022/0403867 A1  Dec. 22, 2022

(30) Foreign Application Priority Data

Jun. 18, 2021 (EP) .................................. 21180367

(51) Int. Cl.
  *F16B 11/00* (2006.01)
  *F16B 37/04* (2006.01)
  *F16B 37/14* (2006.01)

(52) U.S. Cl.
  CPC ............. *F16B 11/006* (2013.01); *F16B 11/00* (2013.01); *F16B 37/043* (2013.01); *F16B 37/14* (2013.01)

(58) Field of Classification Search
  CPC .. F16B 5/01; F16B 5/02; F16B 5/0266; F16B 11/00; F16B 11/006; F16B 37/04; F16B 37/043; F16B 37/044; F16B 37/048; F16B 37/14; F16B 41/00; F16B 41/002; F16B 41/005; Y10T 403/60

USPC ............. 411/82, 82.1–82.2, 337, 372.5–373, 411/517–518
  See application file for complete search history.

(56) References Cited

U.S. PATENT DOCUMENTS

| 4,295,766 A | 10/1981 | Shaaw |
| 7,922,432 B2 * | 4/2011 | Chiu ..................... F16B 5/0208 411/107 |

(Continued)

FOREIGN PATENT DOCUMENTS

| DE | 202006003557 | 6/2006 |
| DE | 202016106073 | 12/2016 |
| WO | 2014032765 | 3/2014 |

OTHER PUBLICATIONS

European Search Report EP 21 18 0367.1 Dated: Nov. 24, 2021.

*Primary Examiner* — Roberta S Delisle
(74) *Attorney, Agent, or Firm* — Volpe Koenig

(57) ABSTRACT

A retaining device for attachment of objects to a wall surface includes a main body, a fastening arrangement, and a cover lockable to the main body that arches over the fastening arrangement. The main body has a bottom side, that faces the wall during mounting, and a top side, that faces away and includes a retaining ring. The fastening arrangement includes a fastener and a centering cap which fixes the fastener. The bottom side of the main body has a circular-ring-shaped surface, on inner and outer edges of which, in each case, one closed encircling web is provided which faces away from the bottom side. Two passage openings are provided in the circular-ring surface between the top and bottom sides. When attached, the main body is pressed onto the wall and an adhesive is injected through one of the passage openings until it emerges again at the other passage opening.

19 Claims, 4 Drawing Sheets

(56) References Cited

U.S. PATENT DOCUMENTS

| | | | | |
|---|---|---|---|---|
| 8,939,691 B2* | 1/2015 | Tseng | ............... | F16B 21/04 |
| | | | | 411/347 |
| 2002/0162925 A1* | 11/2002 | Song | ............ | A47G 25/0635 |
| | | | | 248/223.41 |
| 2006/0249638 A1* | 11/2006 | Ehrke | ............... | A47K 10/08 |
| | | | | 248/205.5 |
| 2011/0070049 A1* | 3/2011 | Wang | ............... | F16B 5/0208 |
| | | | | 411/372.6 |
| 2011/0250034 A1 | 10/2011 | Swanson | | |
| 2012/0224935 A1* | 9/2012 | Chiu | ............... | F16B 5/0208 |
| | | | | 411/352 |

* cited by examiner

HOLDING DEVICE AND METHOD FOR ATTACHING SAME

INCORPORATION BY REFERENCE

The following documents are incorporated herein by reference as if fully set forth: European Patent Application No. EP21180367.1, filed Jun. 18, 2021.

TECHNICAL FIELD

The present invention is concerned with a retaining device for attachment of components to a wall, in particular lightweight components, which may serve for interior paneling in vehicle and aircraft construction, in ships, trains, buses, vehicle trailers and camper vans. It is also provides a method for attaching such a retaining device to a wall surface.

BACKGROUND

Inner panels, specifically wall elements in vehicles and particularly aircraft, are an important design feature of the interior space and furthermore contribute to thermal or acoustic insulation. They are frequently designed as a shell part without any load-bearing function and are therefore intended to be as light as possible. In aircraft construction, it has long been known to use wall elements composed of sandwich sheets with a honeycomb core. In this case, paper, aluminum or plastics (or composite material therefrom) serve as material. What is common to these wall elements is that their connection points with respect to a load-bearing structure or the fastening of further elements to them are/is scarcely able to be realized with the known fastening means, such as screws, nails or adhesive spot bondings.

Various solutions to this problem are known in the prior art. So-called inserts with threaded nuts, clamps or detents are adhesively bonded in over-dimensioned blind holes in the sandwich panel, wherein an adhesive fills the space between the insert and the honeycomb material in a form-fitting manner and, in the cured state, dissipates the introduced load from the fastening point into the sandwich panel.

It is easy to understand that such a fastening point constitutes a not insignificant weight and requires a high outlay during installation. However, it provides a suitable force/form-fitting interface at precisely the intended point for a fastener to be used at a later stage. At the same time, this means that such an insert has to be prepared and introduced beforehand at exactly the right point.

So-called clip connectors are likewise known. Broadly speaking, these provide a classical fastening element, such a nut, a clamping device for a bolt or a latching element connected to a clip. The clip is pushed onto a sandwich panel at the edge and holds the fastening element in a target position, for example relative to a pre-drilled fastener opening. This type of fastening is not cumbersome in terms of mounting, but, without additional outlay, can be used only at the edges of a sandwich sheet.

Both of the solutions described here provide their fastening element on the rear side (not intended to be seen) of the sandwich panel. On the front side, only the opening into which the counterpart fastening element, that is to say a screw, a bolt, a locking peg or a functional equivalent, is intended to be introduced is visible.

In the prior art, it is known to attach objects, in particular to tiles in bathrooms, via a fastening device which is adhesively bonded to the wall over a full area. This can be realized by double-sided adhesive tapes or, as shown in DE 20 2006 003 557 U1, by a fastening device which is attached to a wall surface and forms a cavity between itself and the wall surface. Said cavity is backfilled (injected) with adhesive and thus constitutes an adhesion which provides a good fit even on uneven backgrounds.

SUMMARY

It is an object of the invention to refine this prior art in such a way that it can meet the specific requirements in the case of lightweight walls in aircraft construction, is lighter and is easier to use.

This object is achieved by a fastening element, which is commonly also referred to as a retaining protuberance, having one or more of the features described herein. Variants and exemplary embodiments are described below and in the claims. A method for attaching a retaining device is likewise described.

A retaining device or a retaining protuberance serves for attaching objects to a wall. Here, wall or wall surface is intended to be not exclusively just a vertical, planar surface of a building but a general surface, which is informally referred to as a wall. Such a retaining device accordingly comprises a main body, the bottom side of which is intended to be that side facing toward the wall during the mounting and the top side of which is intended to be that side facing away from the wall. The basic configuration is supplemented by a fastening arrangement and a cover which can be locked to the main body and which arches over the fastening arrangement. Here, the fastening arrangement, as briefly mentioned above, constitutes the first half of a force- and/or form-fitting interface. It comprises a fastener and further, use-specific components and will be discussed below.

The main body has a central opening which defines a central axis which is perpendicular to the main body. A counterpart fastener engages through said central opening at a later stage, said counterpart fastener being designed in a manner complementary to the fastener, which is connected at least to the main body. The fastener connected to the main body in the fastening arrangement may be a threaded element (screw, threaded bolt), a nut (including cap nut), a snap-action fastener or a clamping element (for example a sleeve). The fastening arrangement is preferably connected captively, and optionally in a rotationally fixed manner, to the main body. Here, "connected" encompasses welded to, adhesively bonded to or held in place mechanically (secured, pressed on, latched, clamped) or combinations thereof or technical equivalents.

According to the invention, the main body has on its bottom side a circular-ring-shaped surface, which is arranged symmetrically with respect to the central axis; in other words, which annularly surrounds the central opening. Provision is made on the inner edge and outer edge of said circular-ring surface of in each case one closed encircling web which projects from the bottom side. Here, in one variant, the web at the inner edge may have a greater height, as considered relative to the plane of the circular-ring surface, than the web at the outer edge. In this way, the web at the inner edge may be configured as a centering device, which facilitates accurately fitting, central arrangement around the bore provided in a wall opening (for the counterpart fastener).

The main body furthermore has at least two (further) passage openings in the circular-ring surface between top side and bottom side. The connecting line between the positions of the two passage openings ideally intersects the central axis. In geometrical terms, this means that said openings are preferably arranged offset by 180° on the circular-ring surface.

On the bottom side of the main body there is therefore, as a result of this design, an annular channel which is delimited laterally by the webs described. The two openings allow access to said annular channel from the top side of the main body even if the bottom side bears on a planar underlying surface, because the two specified webs at the outer edge and inner edge define a spacing between the circular-ring surface and the underlying surface.

Preferably, the web at the inner edge of the circular-ring surface is provided with a closed annular adhesive track. This adhesive track primarily serves to fix the main body or the retaining device to the wall surface in a target position and also to permit a certain sealing action with respect to the central opening. As mentioned, a (counterpart) fastening element is guided at a later stage through the wall element and the central opening into the fastener (mounted in the fastening arrangement); therefore, any adverse effect on the free passage is disadvantageous.

The adhesive track may be realized as applied adhesive or as double-sided adhesive tape. The adhesion may, for example, also be realized first of all by the pressing pressure during the mounting. Alternatively or equivalently, the adhesive track may also be realized on the outer ring or on both rings.

A preferred embodiment is obtained if the web at the inner edge of the circular-ring surface has a greater height. Here, greater means that the web, in relation to the plane of the circular-ring surface, projects further than the web at the outer edge. In this way, better sealing is achieved at the center. In some cases, this can be achieved by a difference of less than one millimeter. If the difference is selected to be significantly larger, the inner edge may be used as a centering device with respect to the wall opening and thus facilitates the mounting process. For this purpose, a pre-drilled bore (or the diameter thereof) in the underlying surface may be configured in such a way that the inner edge bears against the bore edge.

The circular-ring surface discussed above may be configured as a planar surface with perpendicular or inclined inner-/outer-edge webs. Alternatively, oval curvature which is barrel-shaped in cross section is also conceivable, this helping to increase the volume of the circular-ring-shaped channel. Furthermore, the webs may be shaped in such a way that, instead of on a planar surface, they may also be placed flush on a concave or convex surface.

As has already been mentioned, the retaining device according to the invention basically comprises a main body, a fastening arrangement and a cover. Here, the fastening arrangement is a subassembly composed of at least one fastener and a hollow-cylindrical or sleeve-shaped centering cap. The centering cap serves to hold the fastener in an intended position relative to the main body, while the cover in turn constitutes a securing element, which fixes the fastening arrangement in the main body. As fastener in the fastening device, the following are possible: threaded elements, nuts, cap nuts, snap-action fasteners, clamp(s) and latching elements.

The centering cap in turn has a first and a second longitudinal end. It is designed in such a way that it can be connected to the fastener and then covers the latter substantially along the longitudinal axis thereof. For this purpose, it has at the first longitudinal end a retaining device for the fastener, and has at its second longitudinal end an opening which permits access to the interior of the centering cap. As described in figures and by way of example, the fastener, if designed as a screw, is retained at one end, for example at the screw head, and the screw shank is arranged along the central longitudinal axis of the centering cap. In this way, the shank is surrounded in a spaced-apart manner by the sleeve on all sides. At the second longitudinal end, the sleeve end is accessible in order for the counterpart fastener, in the fitted state, to be able to engage into the fastener.

Preferably, the centering cap is designed in such a way that it can be arranged in a rotationally fixed manner in the main body. For this purpose, at its second longitudinal end, radially outwardly pointing centering noses are provided in order to engage into correspondingly shaped centering grooves in the main body. In this case, correspondingly shaped means a technical principle such a key-lock or tongue and groove or technical equivalents. In this way, it is possible for example for a form fit between main body and centering cap to be achieved, which effects the prevention of rotation between main body and centering cap. Preferably, the connection of main body and centering cap is configured to be releasable.

On the top side of the retaining device, more precisely on the top side of the main body, it is furthermore possible for provision to be made of a circular retaining ring which is formed in one piece thereon and which is arranged symmetrically with respect to the central axis. In this embodiment, the retaining ring can act as a kind of cage, which, in addition to the centering noses, prevents a deviation of the connected fastening element of the retaining device.

The cover already discussed above is of substantially bell-shaped or pot-shaped form. The single access opening into the interior space of the cover is therefore provided with an edge region. The cover is thus shaped and dimensioned in such a way that it can be locked in a form-fitting manner to the retaining ring. Functionally, the cover can be fitted over the retaining ring or centrally inserted into it and fixed there.

In order to permit the securing function, already discussed above, of the cover, specifically the fixing of the fastening arrangement in the or on the main body or retaining ring, locking elements are provided. Said locking elements are preferably provided at the retaining ring as well as at the cover (in particular at the edge region) such that, through their interaction, cover and retaining ring (or the main body) can be fixed in a defined end position relative to one another in a manner releasable or not releasable from one another.

The locking elements between cover and retaining ring may comprise here: threads, latching elements, clamping elements, adhesives and also technically expedient combinations and technical equivalents.

A retaining device as described above may be produced from metal or from plastic or as a combination of plastic and metal components. As plastics, in particular thermoplastics or polymers which can be used in injection molding processes are possible. Preferably, the main body may be manufactured from transparent or semi-transparent plastic. As will be explained further below, the circular-ring-shaped channel serves as adhesive reservoir and adhesive bond. A (semi-)transparent design makes it possible to visually check whether the channel is completely filled and free of bubbles.

In one refinement, the cover may have a predetermined separation line along which the cover can be cut open or broken open. This may be achieved by way of a slot-shaped separation line which is bridged by connecting elements. Said connecting elements are broken open by a suitable tool under the action of force such that the cover is broken into two or more parts. If the device as a whole is considered in the mounted state, this means that, in this way, the centering cap is exposed and can be removed from the main body (in the case of a releasably applied connection). This makes it possible to release the fastening arrangement from the main body after the counterpart fastener has been removed. It is thus possible for example for a defective counterpart fastener (damaged thread) to be replaced, and at the same time, by way of a new fastening arrangement, for a replacement which is equivalent in terms of extraction force to be realized, without the need for change regarding the main body or the existing bore. If cover and main body are connected to one another via snap-action/latching fasteners, this exchange can even be realized largely without a tool.

The dimensioning of a retaining device as described follows the technical requirements of the planned use. The diameter of the main body and thus also the size and volume of the circular-ring-shaped adhesive channel is defined on the basis of the condition of the wall and the forces which the retaining device has to absorb. A main body which is dimensioned to be large in terms of diameter allows the surface pressure (at a given load) to be reduced. In order at the same time to control the quantity of adhesive, it is of course possible for the channel, at the bottom side, to be designed to be only so wide that the desired retaining action is achieved. The dimensioning of the fastening arrangement can be defined on the basis of the fastener to be used, its length and its diameter in a corresponding manner. A person skilled in the art can realize this design with the aid of his or her specialist knowledge.

In principle, a method for attaching a retaining device as described above comprises the following steps:

Providing a wall element having an opening, onto/into which the retaining device is to be introduced. A retaining device likewise provided, more precisely the bottom side of the main body, is pressed onto or attached to the wall, wherein the central opening of the main body is arranged in a manner concentric with the wall opening. Attaching means adhesively bonding by means of an adhesive ring or else temporarily mechanically fastening (retaining).

Subsequently, an adhesive is introduced or injected into the circular-ring-shaped channel through the first of the two passage openings from the top side of the main body. This can be carried out with the aid of an adhesive gun, a tube or a syringe. The adhesive will spread along the circular-ring-shaped channel situated on the bottom side, the second opening serving here as a vent. As a result of the arrangement with 180° offset on the circular ring, the plastic, figuratively speaking, flows around the central opening, guided by the circularly arranged webs on the bottom side, until the adhesive reaches the vent opening and emerges there. The achievement of the adhesive bonding can thus be checked visually. If a transparent plastic is used at the main body, the degree of filling can be estimated and precise dosing of the adhesive quantity is made possible.

Subsequently, the adhesive cures. A person skilled in the art selects a suitable adhesive according to usage situation and material of main body and wall. The viscosity is matched to the dimensions of the passage bores or of the circular-ring-shaped channel. Use may be made of adhesives with two components, with mixing thereof taking place directly at the time of injection. Also conceivable are air-curing adhesives, fast-curing adhesives, or adhesives whose activators are provided for example as a coating in the annular adhesive channel.

After the curing, the retaining device can be used as intended.

From the explanation above, it is made clear that the retaining device according to the invention is (normally) mounted on the rear side of a wall, on the front side of which an object is to be attached. The anchoring is thus realized in that the object and the retaining device clamp the wall situated therebetween. The counterpart fastener discussed above is guided from the front side through the second end of a passage opening or bore in the wall, at whose rear (first) end the retaining device as described above has been premounted. There, the counterpart fastener engages into the fastening arrangement in a force- or form-fitting manner, with clamping action, with latching action or with locking action. A retaining arrangement consequently comprises a retaining device and a counterpart fastener.

In the case of the lightweight walls mentioned in the introduction, the method described has the advantage that the force is not introduced into the volume of the wall, as with a classical screw connection, and also there is no need for replenishment of the hollow chambers to provide an anchoring base. Moreover, the method described can be adapted easily to walls of different thicknesses through the selection of a corresponding length of the counterpart fastener.

Here, the use of the expressions front side and rear side is not meant to be restrictive, but relates to the most common usage situation. If the retaining device according to the invention is designed in an aesthetically appropriate manner, it is also conceivable for example for it to be used so as not to be noticeable in a disturbing way at a separating wall which is accessible on both sides.

According to design and dimensioning of main body, fastening arrangement and cover, the retaining device may be mounted according to the description in its entirety or in that, firstly, only adhesion of the main body takes place. This allows better visual control of the adhesive bonding, and any adhesive escaping into the central bore can be removed. Moreover, it may be more favorable, according to installation position, for a first component that is as light as possible to be adhesively bonded.

This description of the method does not include all possibly necessary control, adjustment or maintenance steps. This does not however affect the completeness of the description since intermediate steps do not influence the central inventive concept described.

BRIEF DESCRIPTION OF THE DRAWINGS

The invention will now be discussed by way of example with reference to the appended drawings.

DETAILED DESCRIPTION

Figure 1:
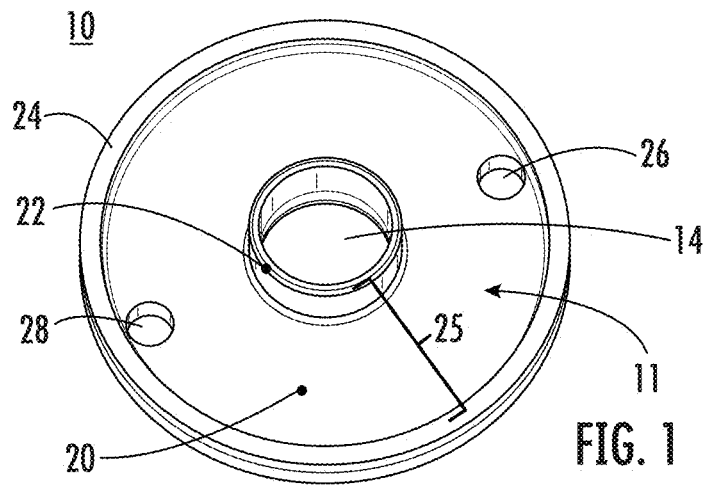
FIG. 1 shows a perspective view of the bottom side 11 of a main body 10.

A main body 10 of conventional design with its main features is considered in FIG. 1. The bottom side 11 has a circular-ring surface 20 with a central opening 14. The inner boundary is formed by the web 22 at the inner edge. A circular and closed encircling web 24 constitutes the outer edge. The webs and the circular-ring surface thereby form a kind of flat circular-ring-shaped channel or adhesive channel 25. The two passage openings 26 and 28, which connect said channel to the top side 12 of the main body 10, can be seen.

Figure 2:
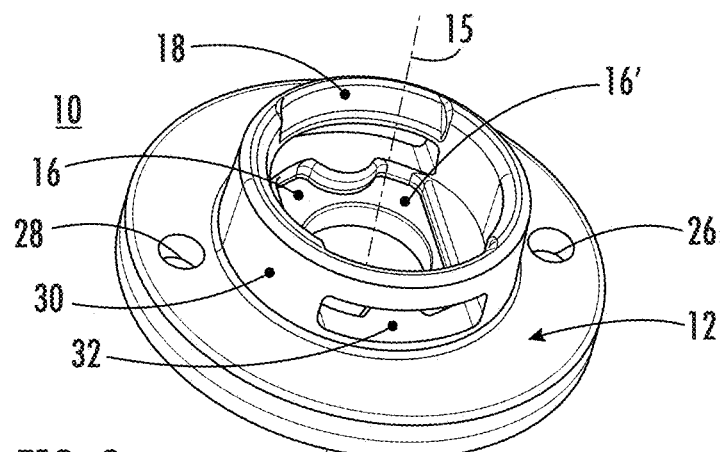
FIG. 2 shows a perspective view of the top side 12 of a main body 10 with a retaining ring 30.
Figure 3:
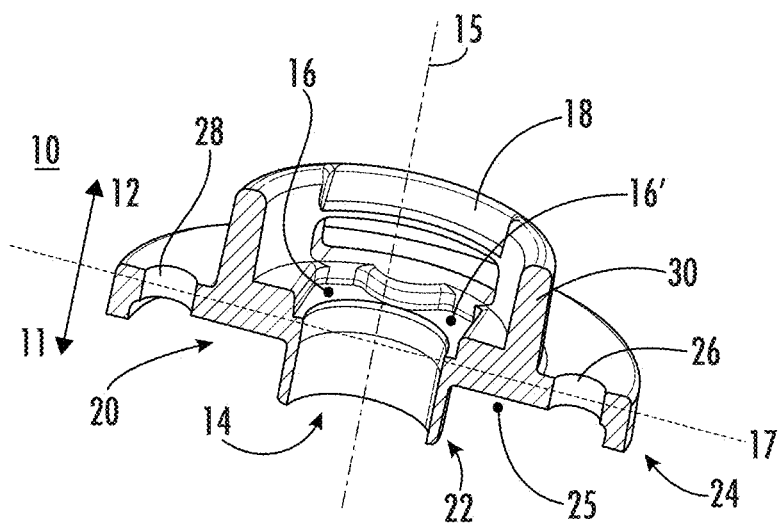
FIG. 3 shows a cross section through a main body 10.

FIG. 2 shows the main body 10 from FIG. 1 as viewed from the top side 12 thereof. Comparison with FIG. 1 reveals the position of the passage openings 26 and 28, these being arranged "oppositely", in an informal sense, on the circular ring or on a common connecting line 17 with the central opening 14. FIG. 2 shows the retaining ring 30 situated on the top side, which, in its place on the top side 12, forms a radial boundary similar to a pot. If the main body 10 is adhesively bonded to a wall surface, it thus provides a receptacle for a fastening arrangement and a cover (omitted in FIG. 2). In principle, the main body 10 thus performs the function both of a load distribution disk and a fastening interface. For this purpose, in FIG. 3, there are formed at the base of the retaining ring 30 in the main plane of the main body 10 various centering grooves 16, 16', . . . which—arranged symmetrically about the central axis 15—together form a depression, said depression being able to receive the second end 62 of the centering cap 58 of the fastening arrangement 50 in a form-fitting manner (cf. FIGS. 7 and 8).

In the embodiment shown, two locking elements 32 in the form of apertures through the ring wall are formed in the retaining ring. As is clear when looking at FIGS. 7 and 8 together, said apertures serve for receiving latching noses (locking elements 42) which are provided on the edge region 48 of the cover. In order to permit the introduction of said latching noses into the retaining ring, provision is made of introduction aids 18, which are formed here as short, inwardly pointing ramps.

FIG. 3 once again shows, in cross section, the functionality and distribution of the functional regions just discussed. The manner in which the webs 22 and 24 projecting from the bottom side 11 form the adhesive channel 25 between themselves and the circular-ring-shaped surface 20 can be clearly seen. What is shown is that variant in which the web 22 at the inner edge has a greater height than the one at the outer edge 24. In this way, the main body can be centered at or in a bore opening. In this case, the central axis 15 of the main body as well as of the inner-edge web 22 would coincide with the central axis of the bore opening.

Figure 4:
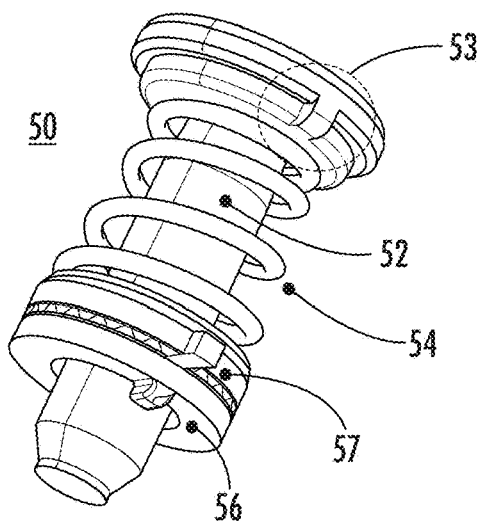
FIG. 4 relates to a fastening arrangement 50 without centering cap 58 in a specific extended embodiment.
Figure 6:
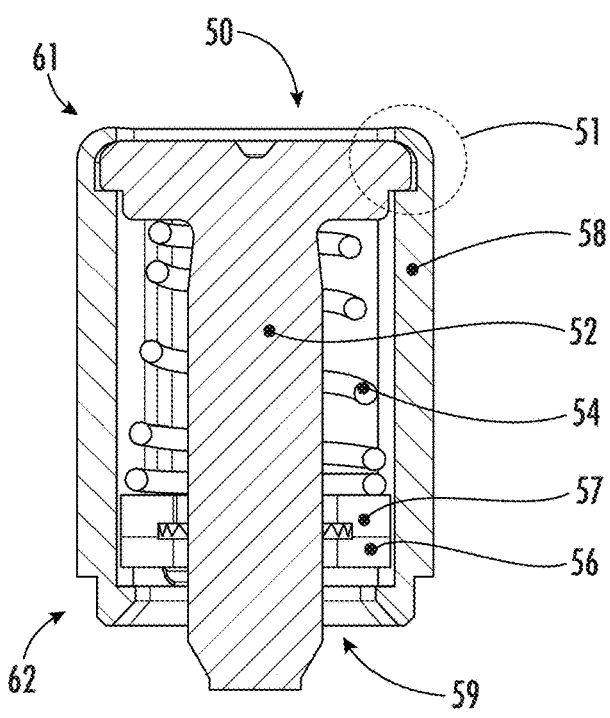
FIG. 6 shows a longitudinal section through a fastening arrangement comparable to FIG. 4.

FIGS. 4 and 6 show details concerning the fastening arrangement 50, wherein, in FIG. 4, only the centering cap 58 is omitted. The fastener 52 shown here is a screw, which is captured in the centering cap 58 at the first longitudinal end 61 via an encircling groove 51 as retaining device. It may be fitted in a rotationally fixed manner, for example with the aid of a retaining nose 53. In the variant shown here, a spiral spring 54 is situated in the space between the centering cap and the shank of the screw. Said spiral spring is supported both against the bottom side of the screw head and on a combination of support disk 56 and latching disk 57. The latter likewise has a peg-like rotation-prevention means. As FIG. 6 shows, the screw (feature 52) is fitted here in such a way that, in the shank region, it is surrounded in a circular-ring-shaped manner by the combination of support disk and latching disk and can—in principle—be moved along the longitudinal axis of the screw. At the bottom end of the centering cap 58 (second longitudinal end 62), the centering cap is open (opening 59). The counterpart fastener for this screw 52 shown would be a nut or cap nut in this case. Inter-engagement of the thread of screw and nut during the setting process would result in the nut moving—when viewing FIG. 6—in the direction of the screw head. Said nut then meets the support disk 56 and pushes the latter against the latching disk 57 and the spiral spring 54. The rotation of the nut relative to the screw is absorbed by the latching disk 57, which, in cooperation with the spiral spring, ensures that reverse-rotation prevention is provided for the screw connection.

The variant of a fastening arrangement that is shown in FIGS. 4 and 6 is just one of many possible variants. In the simplest case, a stable hollow centering cap into which there engages for example a clamping device (counterpart fastener) which locks upon tension in the sleeve would be conceivable. A further variant could be realized in that provision is made of one or more annular grooves or undercuts in the cylindrical interior space of a centering cap, into which latching noses of a (counterpart) fastener, which is shaped in a complementary manner, can engage with locking action.

Consequently, what is advantageous with the quasi modular construction of the retaining device is that the main body can be used for a large number of fasteners or fastening arrangements, which reduces the complexity in the case of storage and mounting. A further advantage is the possibility of releasing and changing the connection (depending on the selected configuration, as described above).

Figure 5:
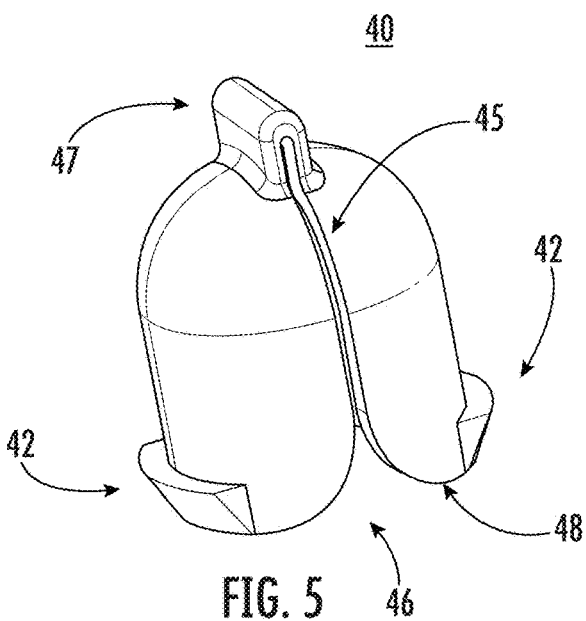
FIG. 5 shows a cover 40 in a first embodiment.
Figure 7:
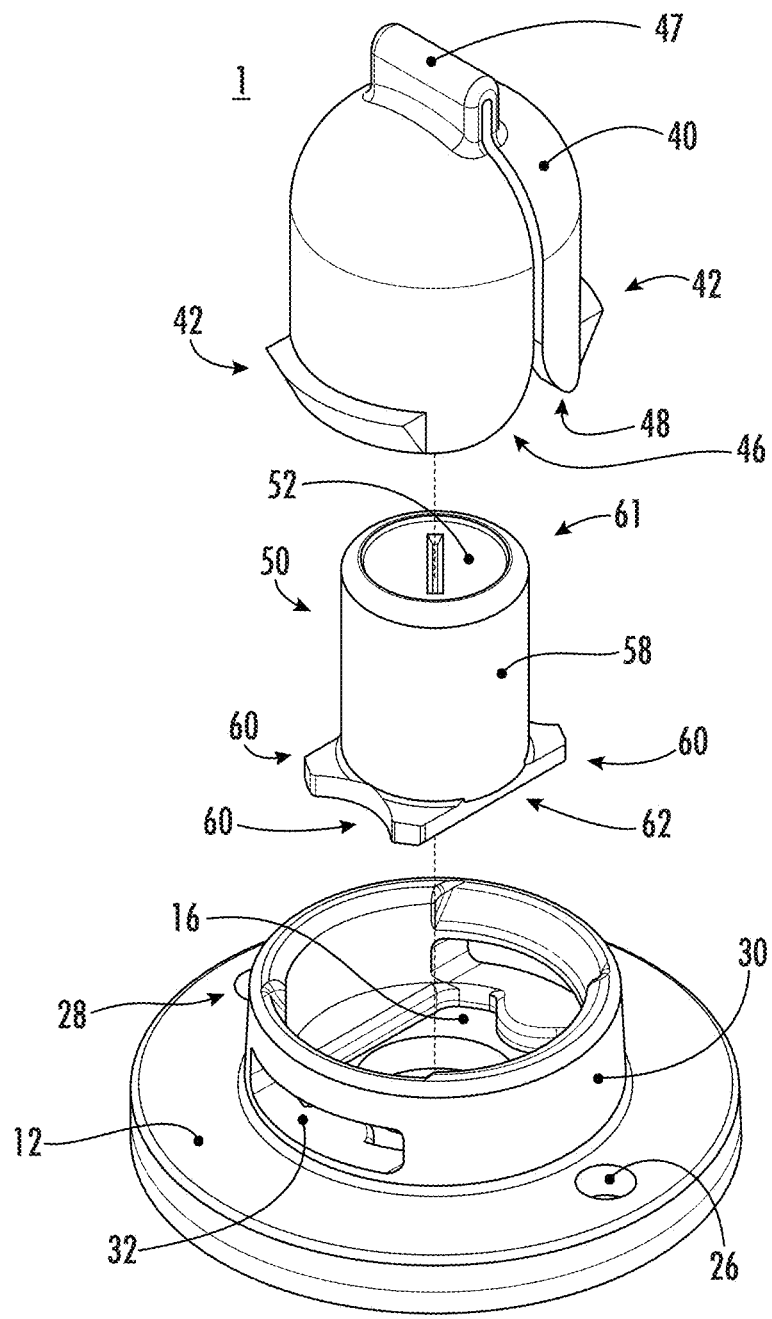
FIGS. 7 and 8 each show an exploded illustration of a retaining device 10, the retaining devices having covers 40 of different design.

FIG. 5 shows a cover 40 in a first embodiment variant that is designed in such a way that it can latch into the retaining ring 30 shown in FIG. 7. For this purpose, the cover has at the edge region 48 locking elements 42 which are designed in a manner complementary to the elements 32. The cover 40 has a predetermined separation line 45, which here is configured as a separation gap and extends over the apex of the cover. The two halves are held together by a connecting element 47, which is designed here as a clip in the form of a loop. This shape was selected because it is consequently possible for the clip to be removed easily using diagonal pliers or a knife and thus for the cover to be divided. The separation line 45 runs out into an arcuate widening toward the edge region 48 or the opening 46. This notch facilitates the removal of the cover halves from the retaining ring 30.

Figure 8:
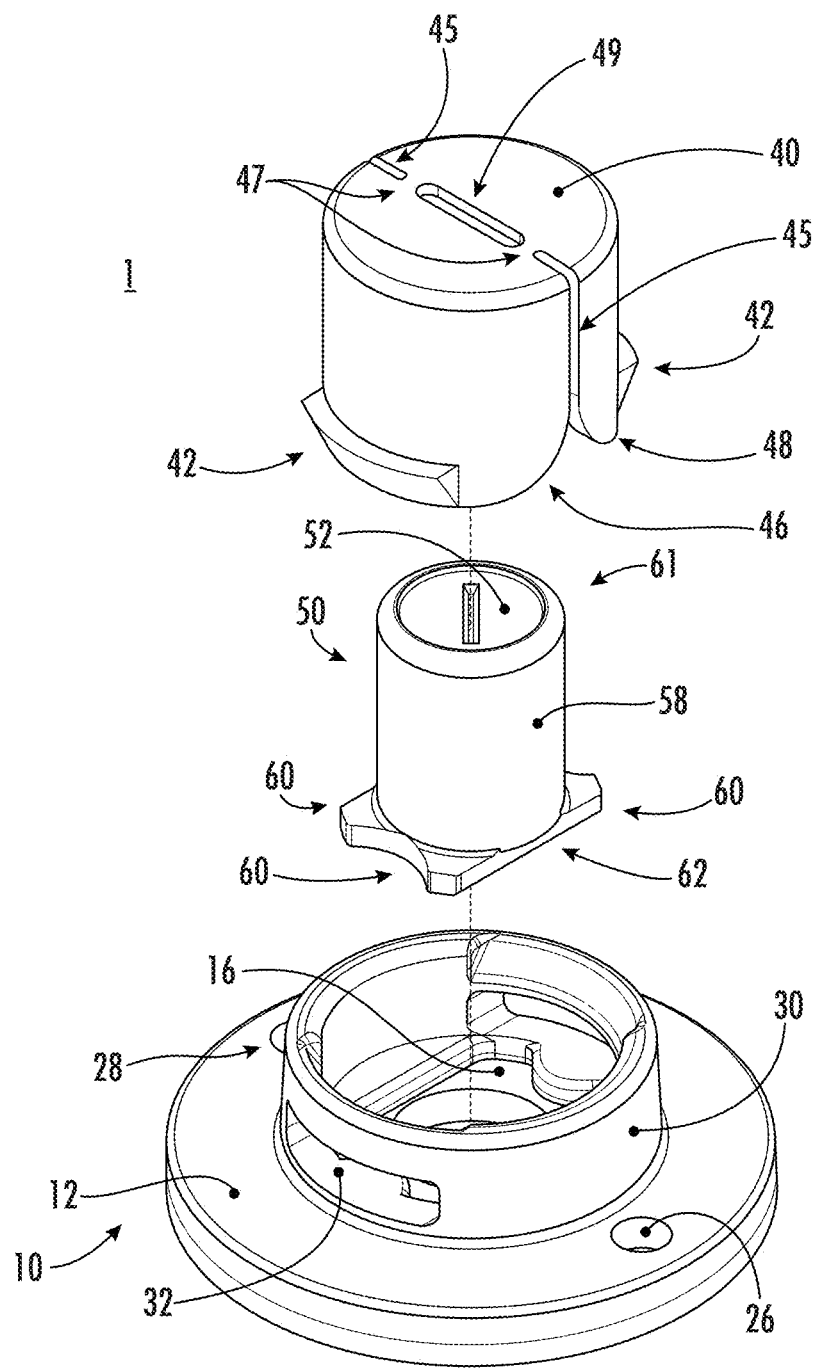

FIGS. 7 and 8 show a combination of main body 10, fastening arrangement 50 and two differently designed covers 40. These elements are illustrated pulled apart from one another along their longitudinal axis/mounting axis. With regard to the basic functionality and elements, reference should be made to the sections above. It should be emphasized that, in these drawings, the provided interengagement of the centering noses 60 at the second longitudinal end 62 of the centering cap 58 with the centering grooves 16 in the main body 10 is shown. The cover 40 then encloses the fastening arrangement during the assembly, the locking elements 42 of the cover 40 sliding along the introduction aids 18 into the retaining ring 30 in order, there, to latch into the locking elements 32.

The cover 40 in FIG. 8 differs in terms of design from the one shown in FIGS. 5 and 7. The outer shape resembles a cylinder, and the locking elements 42 on the edge region 48 are identical to those in the design in FIG. 7. Here, too, the separation line 45 divides the cover into two halves, these being held together by two connecting elements 47. The separation of the halves is made possible by prying with a screwdriver blade via the slot 49.

The invention claimed is:

1. A retaining device for attachment of objects to a wall surface, the retaining device comprising:

a main body, a fastening arrangement, and a cover which is lockable to the main body and arches over the fastening arrangement;

the main body includes a bottom side, which is adapted to face toward the wall surface during mounting, and a top side, which adapted to face away from the wall, and a central opening that extends between top side and bottom side and defines a central axis which is perpendicular to the main body;

a circular-ring-shaped surface is located on the bottom side of the main body and is arranged symmetrically about the central axis;

closed encircling webs project from the bottom side at each of an inner edge and an outer edge of the circular-ring-shaped surface; and at least two passage openings are provided in the circular-ring surface that extend between the top side and the bottom side.

2. The retaining device as claimed in claim 1, wherein a connecting line that extends between the two passage openings intersects the central axis.

3. The retaining device as claimed in claim 1, wherein at least one of the closed encircling webs at the inner edge or at the outer edge of the circular-ring surface includes a closed annular adhesive track.

4. The retaining device as claimed in claim 1, wherein the closed encircling web at the inner edge of the circular-ring surface has a greater height relative to a plane of the circular-ring surface than the closed encircling web at the outer edge.

5. The retaining device as claimed in claim 1, wherein the closed encircling web at the inner edge is configured as a centering device for arrangement in a bore.

6. The retaining device as claimed in claim 1, wherein the fastening arrangement comprises a fastener, and a hollow-cylindrical or sleeve-shaped centering cap with first and second longitudinal ends, and the centering cap is configured to be connected to the fastener and covers the fastener substantially along a longitudinal axis thereof.

7. The retaining device as claimed in claim 6, wherein the centering cap has a retaining device for the fastener at the first longitudinal end, and has an opening which permits access to the interior of the centering cap at a second longitudinal end.

8. The retaining device as claimed in claim 6, wherein the centering cap has radially outwardly pointing centering noses which are configured to engage into correspondingly shaped centering grooves in the main body at the second longitudinal end that effect prevention of rotation between the main body and the centering cap.

9. The retaining device as claimed in claim 1, further comprising a cylindrical retaining ring formed in one piece on the top side of the main body, and cylindrical retaining ring is arranged symmetrically with respect to the central axis.

10. The retaining device as claimed in claim 1, wherein the cover is substantially bell-shaped or pot-shaped and has a single access opening which is provided with an edge region, and the cover is shaped and dimensioned such that the cover is lockable in a form-fitting manner to the retaining ring.

11. The retaining device as claimed in claim 10, further comprising locking elements at the retaining ring and at the cover that interact with one another to fix the cover and the retaining ring in a defined end position relative to one another.

12. The retaining device as claimed in claim 11, wherein the locking elements are releasable from one another.

13. The retaining device as claimed in claim 11, wherein the locking elements comprise one of: threads, latching elements, clamping elements, or an adhesive.

14. The retaining device as claimed in claim 1, wherein the retaining device is comprised of at least one of metal or plastic.

15. The retaining device as claimed in claim 1, wherein the fastener comprises one of: a threaded element, a nut, a cap nut, a snap-action fastener, or a clamp.

16. The retaining device as claimed in claim 1, wherein the cover has at least one predetermined separation line along which the cover is openable, and at least one connecting element which bridges and connects the cover at the predetermined separation line.

17. A retaining arrangement comprising the retaining device as claimed in claim 1 and a counterpart fastener for engagement into the fastening arrangement, wherein the retaining device is attached centered via the central opening around a first end of a passage bore in a wall, and the counterpart fastener, introduced from a second end of the passage bore, is introduced through the wall into the retaining arrangement and, there, engages into the fastening arrangement in a force- or form-fitting manner, with clamping action, latching action or locking action.

18. A method for attaching the retaining device as claimed in claim 1 to a wall, comprising the steps of:
providing the wall having an opening;
pressing the bottom side of the main body onto or attaching the bottom side of the main body to the wall, with the central opening of the main body arranged concentrically with the wall opening;
introducing or injecting an adhesive through the first of the two passage openings at the top side of the main body; and
continuing to introduce or inject the adhesive until the adhesive emerges through the second passage opening at the top side of the main body.

19. The method as claimed in claim 18, wherein the pressing-on or attachment of the main body includes the webs on the bottom side of the main body being adhesively attached via an adhesive track provided on at least one of the web.

* * * * *